Nov. 8, 1938.    L. M. KERN    2,136,106
SAUSAGE AND METHOD OF PREPARING SAME
Filed April 9, 1936
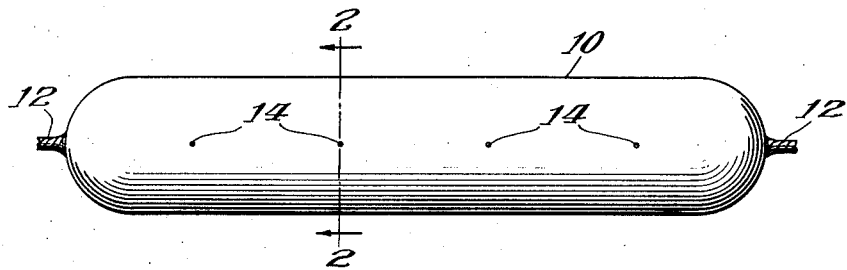
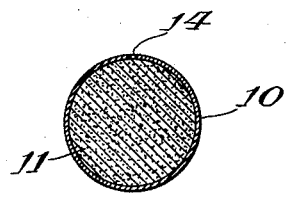
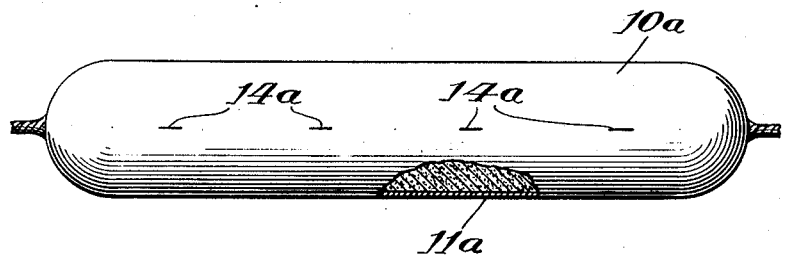
Inventor:
Lillian M. Kern,
By Zabel, Carlson & Wells
Attorneys Patented Nov. 8, 1938

2,136,106

UNITED STATES PATENT OFFICE 2,136,106

SAUSAGE AND METHOD OF PREPARING SAME

Lillian M. Kern, Portland, Maine, assignor, by mesne assignments, to Sidney H. Rabinowitz, Brookline, Mass.

Application April 9, 1936, Serial No. 73,475

16 Claims. (Cl. 99—109)

The invention relates to sausages and a method of preparing them for consumption.

The invention is particularly adapted to be utilized in connection with sausages of the wiener or frankfurter type, these being sausages which are generally processed by being smoked and cooked by the packer and which are generally reheated before they are consumed. When such sausages are provided with natural gut casings, the casings are seldom removed before the sausages are consumed but if the casings are removed they are removed by the consumer while the sausages are being eaten. However, a problem presents itself when sausages of this type are provided with so-called artificial casings, such casings being usually formed by extruding viscose through an annular orifice into a bath which regenerates the cellulose. While it is possible to consume casings of this character, it is generally not desirable to do so as they much resemble paper in their general characteristics. Considerable trouble was encountered in the marketing of frankfurters or wiener sausages having casings of regenerated cellulose as it was found desirable to peel the sausages before they were sold to the consumer and such peeling required considerable time and skill. The problem was solved to some extent by practicing the method disclosed in U. S. Letters Patent 1,825,528 granted to Fritz W. Knudsen, which method comprised stuffing a casing of regenerated cellulose with a meat stock, then subjecting the encased product to a heated temperature sufficiently low to initially form a coagulation on the surface of the product to prevent adhesion of the casing thereto, then increasing the temperature to complete the treatment of the meat stock so that the casing could be removed wihout affecting the coagulated surface of the product. The peeled sausages were supplied to butchers, etc., who, in turn, supplied them to the consumers. It will be readily understood that the Knudsen method did not do away with the necessity of peeling the frankfurters before they were sold to the consumer but it did insure that the peeled frankfurters or wieners would have a pleasing appearance.

The present invention contemplates, preferably, the sale of unpeeled frankfurters or wieners to the consumer, the frankfurters or wieners being provided with casings of regenerated cellulose, or the equivalent, which casings have relatively small apertures formed therein after they have been stuffed and the sausage has been processed. When the consumer heats the sausages in boiling water, the casings split and slough or peel off.

Cellulose sausage casings for wieners or frankfurters can not be punctured prior to stuffing in accordance with the method disclosed in U. S. Letters Patent No. 1,890,315 granted to H. R. De Cressey wherein sausages of the larger types, such as salami and bologna are provided with casings of regenerated cellulose, or the equivalent, which casings are provided with relatively large apertures adjacent the ends thereof before they are stuffed and before the sausage is processed. The casing wall of cellulose casings for wieners or frankfurters is so thin and the method of handling the sausages is such that a casing provided with a hole generally bursts before the sausage could be processed. Also, the consistency of the meat used for wieners or frankfurters is so soft, almost fluid, that it immediately streams out of any hole in the casing, no matter how small the hole is. In practicing the De Cressey method, care is taken to insure clean holes or apertures in the casings so that there will be less tendency of the casing to split during the processing operations. It should be understood also that in processing sausages which are to be sold to the consumer, they are rarely, if ever, subjected to boiling temperatures even if they are of a type which is subjected to a cooking operation during the processing. Therefore, there is very little tendency for the moisture in the casing to vaporize to such an extent that the casing will split because of internal pressure. If the casing did split, it would be extremely undesirable in appearance. It is understood, of course, that sausages of the larger type, such as salami or bologna are generally sliced for consumption and the casing is removed from the individual slices.

Frankfurters or wieners provided with natural gut casings should not be boiled when they are re-heated for consumption. Boiling them causes them to lose their flavor and to become relatively tasteless. Packers recommend that the reheating should be done in water at say 160° F. However, it has been found that when frankfurters or wieners are provided with casings of regenerated cellulose, or the equivalent, they may be boiled for a relatively long period of time without causing deterioration thereof. The sausages retain their flavor and tastiness. It has been found, also, that when the casings of regenerated cellulose, or the equivalent, are each provided with one or more small apertures formed subsequently to the processing operations, the casings will split and slough or peel off if the sausages are heated in water at approximately the boiling temperature. The sausages may be lifted from the split casings with practically no effort and without using any particular degree of care. The sausage itself does not split.

Referring to the accompanying drawing wherein two embodiments of the invention are shown, Fig. 1 is a side view of the wiener or frankfurter which embodies the invention; Fig. 2 is a section taken on line 2—2 of Fig. 1, and Fig. 3 is a side view of a wiener or frankfurter embodying another form of the invention.

Referring for the present to Figs. 1 and 2, the reference character 10 designates a frankfurter sausage casing which is packed with a comminuted meat product 11 of the type usually employed in wieners or frankfurters. The casing 10 preferably comprises regenerated cellulose, the casing being preferably formed by extruding viscose through an annular orifice into a bath which regenerates the cellulose. A relatively long length of this casing is then stuffed with the meat product and the links are formed by twisting the stuffed casing at intervals or by any other suitable method. In Fig. 1, it will be noted that the ends of the casing are twisted as at 12.

After the artificial casing has been stuffed and the sausage has been formed into links, it is subjected to the usual cooking and smoking processes, it being understood that wieners or frankfurters are both smoked and cooked by the packer.

As illustrated in Figs. 1 and 2, the casing is preferably perforated at a plurality of points by the packer after the smoking and cooking operations, the casing 10 being shown with four relatively small apertures 14 which may be formed by an ordinary pin or any other suitable pointed instrument. Of course, if it is so desired, the butcher may form the holes 14 before the wieners or frankfurters are sold to the consumers but it is the best practice to have the packer perform this operation.

The wieners or frankfurters having the perforations 14 in the artificial casings 10 are sold to the consumer who is instructed to boil the frankfurter or wiener for a period of four or five minutes or until the casings 10 split and slough or peel off the meat product 11. The instructions to the consumer may be printed upon the casings 10 if it is so desired. After the casings 10 have sloughed or peeled off of the meat product 11, the peeled frankfurters or wieners may be lifted from the casings 10 and will be found to present a relatively pleasing appearance and to retain their tastiness.

It has been ascertained that it is not necessary to use a certain number of apertures in each casing. Good results have been obtained when a single aperture 14 was provided in the casing 10 but when a single aperture is provided in this manner, the boiling period is generally longer. If desired, a relatively large number of apertures 14 may be provided in the casings 10. The apertures 14 in Fig. 1 have been shown to be arranged in a line extending longitudinally of the wiener or frankfurter. While this arrangement is preferable to some extent, it is not necessary as the apertures may be arranged spirally around the wiener or frankfurter or substantially in any other desired manner.

In Fig. 3 I have shown a wiener or frankfurter which comprises a casing 10a stuffed with a meat product 11a of the same type as the product 11 described above. The casing 10a is of the same material as the casing 10 described above. Instead of apertures 14 formed by a pointed instrument, the casing 10a is provided with a plurality of small slits 14a which may be formed by a sharp knife, or the equivalent. The slits 14a will give the same results as the apertures 14 when the frankfurter or wiener shown in Fig. 3 is boiled. A single slit 14a may be employed or if it is so desired, a relatively large number of them may be employed. Also, they may be distributed around the casing 10a as described in connection with the aperture 14 and the casing 10.

It has been found that while the casings 10 and 10a will split and slough or peel off the wiener or frankfurter when the wiener or frankfurter is heated in water at a temperature somewhat less than the boiling temperature, the results are not as good as when the frankfurter or wiener is actually boiled with the boiling temperature at 212° F. Water which was heated to a temperature of 200° or slightly above either did not cause the casings to split and peel satisfactorily or caused the casings to split and peel very slowly. The results were not satisfactory. When the frankfurter or wiener is subjected to water at the boiling temperature, moisture within the casings expands and causes the casing to split, and the results are far better than when water only a few degrees below the boiling point is employed. Apparently a rapid evolution of steam is preferable or necessary to produce the best results. It was noted that when two or more wieners were left linked to each other, quicker results were obtained.

While the increase in vapor pressure within the casing appears to be the primary reason why it splits, it is also noted that the sausage increases in diameter and weight. Evidently it absorbs moisture during the boiling operation. The increase in diameter may aid in splitting the casing.

It may be mentioned that when the boiling temperature of water is set at 212° F. we use this figure as the boiling temperature at sea level. It has been found that if the water boils at 194° F. under reduced pressure, it is just as effective for bursting a casing as boiling at 212° F. at normal atmospheric pressure.

One advantage of the improved process is that it is not necessary to employ the Knudsen process described above in addition to the improved process as the casings peel readily from frankfurters or wieners when the improved process is practiced even though they have not been subjected to two distinct temperatures during the smoking operation.

While I have shown and described certain embodiments of my invention, it is to be understood that it is capable of many modifications. Changes, therefore, in the construction and arrangement may be made without departing from the spirit and scope of the invention as disclosed in the appended claims, in which it is my intention to claim all novelty inherent in my invention as broadly as possible, in view of the prior art.

I claim:

1. As an article of manufacture, a sausage of the wiener or frankfurter type with a cellulose casing having a rupturing perforation therein formed after the sausage has been smoked and cooked.

2. As an article of manufacture, a sausage of the wiener or frankfurter type with an artificial cellulose casing having a pin hole therein formed after the sausage has been processed by the packer.

3. As an article of manufacture, a sausage of the wiener or frankfurter type with an artificial cellulose casing having a slit therein formed after the sausage has been processed by the packer.

4. As an article of manufacture, a sausage of the wiener or frankfurter type with a regenerated cellulose casing having a rupturing perforation therein formed after the sausage has been processed by the packer.

5. As an article of manufacture, a sausage of the wiener or frankfurter type with a regenerated cellulose casing having a plurality of rupturing perforations therein formed after the sausage has been smoked and cooked.

6. As an article of manufacture, a sausage of the wiener or frankfurter type with a regenerated cellulose casing having a plurality of slits therein formed after the sausage has been processed by the packer.

7. A method of preparing a sausage of the wiener or frankfurter type for consumption, said sausage having an artificial casing of the cellulose type, which method comprises perforating the casing after the sausage has been processed, and then heating said sausage in water at approximately the boiling point until the casing splits and peels or sloughs off of the meat stock.

8. A method of preparing a sausage of the wiener or frankfurter type for consumption, said sausage having a cellulose casing, which method comprises perforating the casing after the sausage has been processed, and then heating said sausage in water at approximately the boiling point until the casing splits and peels or sloughs off of the meat stock.

9. A method of preparing a sausage of the wiener or frankfurter type for consumption, said sausage having a regenerated cellulose casing, which method comprises forming a plurality of pin holes in the casing after the sausage has been processed by the packer, and then heating said sausage in water at approximately the boiling point until the casing splits and peels or sloughs off the meat stock.

10. A method of preparing a sausage of the wiener or frankfurter type for consumption, said sausage having a cellulose casing, which method comprises cutting a non-deforming slit in said casing after the sausage has been processed by the packer, and then heating said sausage in water at approximately the boiling point until the casing splits and peels or sloughs off of the meat stock.

11. As an article of manufacture, a sausage of the wiener or frankfurter type having a regenerated cellulose casing, said casing having therein a post-processing non-deforming perforate formation for rupturing purposes.

12. As an article of manufacture, a regenerated-cellulose-cased sausage of the wiener or frankfurter type having a plurality of post-processing non-deforming rupture effecting perforations in its casing.

13. The process of preparing sausages of the frankfurter style having artificial cellulose casings which comprises stuffing the cellulose casing, curing and finishing the frankfurter in the usual manner, and subsequently aperturing the casing longitudinally.

14. That method of preparing frankfurter style sausages of the cellulose-encased type which comprises filling the casing, linking the filled casing into frankfurter units, curing the latter and thereafter cooling them, and then forming in the frankfurter casings longitudinally extending openings effective to cause them to split in the course of final heating of the frankfurter for consumption.

15. That method of preparing cellulose-encased, frankfurt style sausages which includes the step of pricking the cellulose casing of a stuffed, cured frankfurter to effect subsequent rupturing thereof in the presence of heat.

16. A sausage of the frankfurt style comprising, in combination, an edible filling, a cellulose casing enclosing the filling, and a small aperturing formation lacking in the unfilled casing and received in the filled casing and adapted to effect rupturing thereof in the heating of the sausage for consumption.

LILLIAN M. KERN.